US011118355B2

(12) United States Patent
Clark, Jr.

(10) Patent No.: US 11,118,355 B2
(45) Date of Patent: Sep. 14, 2021

(54) SKYLIGHT ASSEMBLY AND METHOD OF INSTALLING SAME

(71) Applicant: WABASH NATIONAL, L.P., Lafayette, IN (US)

(72) Inventor: John Robert Clark, Jr., Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 16/721,593

(22) Filed: Dec. 19, 2019

(65) Prior Publication Data

US 2020/0199878 A1 Jun. 25, 2020

Related U.S. Application Data

(60) Provisional application No. 62/782,708, filed on Dec. 20, 2018.

(51) Int. Cl.
*E04D 13/03* (2006.01)

(52) U.S. Cl.
CPC .................. *E04D 13/0305* (2013.01)

(58) Field of Classification Search
CPC ... E04D 13/0305; E04D 13/03; E04D 13/034; F21S 11/007
See application file for complete search history.

(56) References Cited

U.S. PATENT DOCUMENTS

| 2,229,594 | A | * | 1/1941 | Seiler | E06B 7/30 |
| | | | | | 359/629 |
| 6,851,379 | B2 | * | 2/2005 | Black | B63B 19/08 |
| | | | | | 114/177 |
| 10,773,571 | B2 | * | 9/2020 | Papafagos | B60J 1/008 |
| 2020/0199878 | A1 | * | 6/2020 | Clark, Jr. | E04D 13/0305 |

OTHER PUBLICATIONS

Tectran, "Skylight Assembly Trailer Pack", https://tectran.com/content/Skylight-Assembly.pdf (Year: 2018).*

* cited by examiner

*Primary Examiner* — Andrew J Triggs
(74) *Attorney, Agent, or Firm* — Quarles & Brady LLP

(57) ABSTRACT

Embodiments of the invention provide a skylight assembly for an enclosure having an enclosure panel with an opening. The skylight assembly includes a lens, a gasket, and a nut. The lens includes an annular lens flange and a lens stem extending axially away from the annular lens flange. The gasket is receivable around the threaded lens stem and is adapted to be seated on the lens flange. The nut includes an annular nut flange and nut stem extending axially away from the nut flange. The nut stem is configured to engage the lens stem to secure the skylight assembly to the enclosure panel and compress the gasket against the enclosure panel.

20 Claims, 19 Drawing Sheets

SKYLIGHT ASSEMBLY AND METHOD OF INSTALLING SAME

CROSS-REFERENCES TO RELATED APPLICATIONS

The present application is based on, claims priority to, and incorporates herein by reference in its entirety, U.S. Provisional Patent Application No. 62/782,708, filed on Dec. 20, 2018, and entitled "Skylight Assembly and Method of Installing Same."

BACKGROUND

Skylight assemblies are often used in trailers and vehicles to allow natural light into otherwise enclosed areas. The skylight assemblies generally provide a transparent or translucent lens that permits sunlight or other light from the external environment to pass through an opening in an otherwise opaque wall. Allowing external light into enclosed areas may improve visibility in typically dark areas, which can be useful for a variety of reasons. For example, a skylight assembly can partially illuminate a trailer or storage container during a loading or unloading process without the use of additional lighting. Greater visibility within the trailer can help ensure that pallets or other items are positioned properly within the trailer during trailer loading. Similarly, improved visibility can help a user accurately pick items during trailer unloading. As an additional benefit, a skylight assembly may allow a user to visually inspect the interior of the enclosure without having to open doors or physically enter into the enclosure.

Typically, skylight assemblies are adhesively coupled to an outer surface of sheet metal or a wall panel. The process of adhesively coupling skylight assemblies to the wall panel has proven difficult at times, and can require specific tooling, procedures, and/or skill sets to properly install the skylight assemblies. Further, adhesive connections can be unreliable and skylight assemblies may release from the surfaces they are initially attached to. As a result, the skylight assemblies may become dysfunctional and/or create an opening in the trailer wall exposing the interior to outside elements, contaminants, temperature changes, creature intrusions, and/or debris.

To address the deficiencies associated with adhesively coupling skylight assemblies to outer surfaces, others have tried to anchor skylights on an interior surface of the enclosure. While a more secure coupling can sometimes be established, the anchors of the skylight assemblies extend into the enclosure and may create cargo catch points. Objects being moved within the enclosure can sometimes snag onto the catch points, which can result in damage or displacement to the objects being moved, as well as to the skylight assemblies. Further, anchors of the skylight assemblies extending into the enclosure can also impose space restrictions to objects within that space.

SUMMARY

Some embodiments provide a skylight assembly for an enclosure having an enclosure panel having an interior side and an exterior side and provided with an opening therethrough. The skylight assembly may include a lens with an annular lens flange and a lens stem extending away from the annular lens flange. The lens stem may be dimensioned to be received by the opening of the enclosure panel. The skylight assembly may also include a gasket dimensioned to be received around the threaded lens stem and adapted to be seated on a mounting surface of the annular lens flange. The skylight assembly may further include a nut having a mounting flange and a nut stem extending away from the mounting flange. The nut stem may be configured to engage the lens stem to secure the skylight assembly to the enclosure panel and compress the gasket against the enclosure panel.

Some embodiments provide method for installing a skylight assembly through an opening of an enclosure panel having a first side and a second side, where the skylight assembly includes a lens, a nut, and a gasket. The method may include engaging the gasket along a mounting surface of the lens and anchoring the lens and the gasket to the enclosure panel by inserting a lens stem of the lens through the opening from the first side of the enclosure panel. The method may also include moving the nut toward the opening from the second side of the enclosure panel to engage a nut stem of the nut with the lens stem, and rotating the nut to force the nut toward the lens until the nut is flush with the second side of the enclosure panel.

Some embodiments provide a skylight assembly for an enclosure panel with a first side and a second side having an opening therethrough. The assembly may include a lens being at least partially transparent and including an annular lens flange and a lens stem extending axially away from the annular lens flange. The lens stem may be dimensioned to be received by the opening of the enclosure panel so that the annular lens flange is adjacent the first side of the enclosure panel. The assembly may further include a nut being at least partially transparent and having a mounting flange and a nut stem extending axially away from the mounting flange. The nut stem may be configured to rotatably engage the lens stem from the second side of the enclosure panel to secure the skylight assembly to the enclosure panel with less than a 90 degree rotation of one of the lens or the nut.

These and other features of the present disclosure will become more apparent from the following description of the illustrative embodiments.

Figure 1:
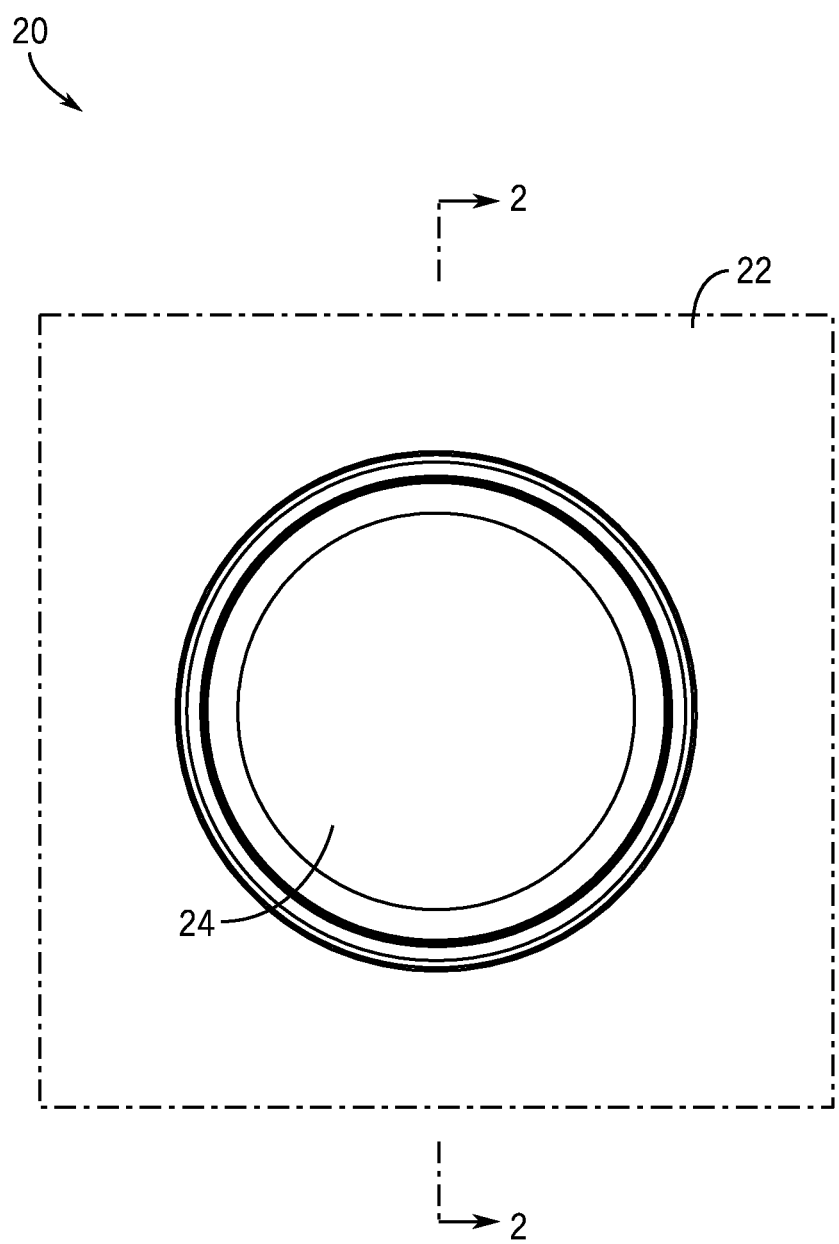
FIG. 1 is a front view of a skylight assembly disposed within an enclosure panel according to some embodiments of the invention.

Corresponding reference characters indicate corresponding parts throughout the several views. Although the drawings represent embodiments of the present disclosure, the drawings are not necessarily to scale and certain features may be exaggerated in order to better illustrate and explain the embodiments of the present disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Generally, some embodiments of the invention provide a skylight assembly that provides secure coupling to an enclosure wall while also reducing (and, in some cases, eliminating) possible snag points within the enclosure. The coupling of the skylight assembly to the enclosure wall can occur within the thickness of the enclosure wall, and the innermost surface of the skylight assembly can extend approximately flush with the interior surface of the enclosure wall, so as to eliminate possible cargo catch points within the enclosure. The skylight assembly can be readily coupled to an enclosure wall, so that a single person can install the entire assembly.

Figure 2:
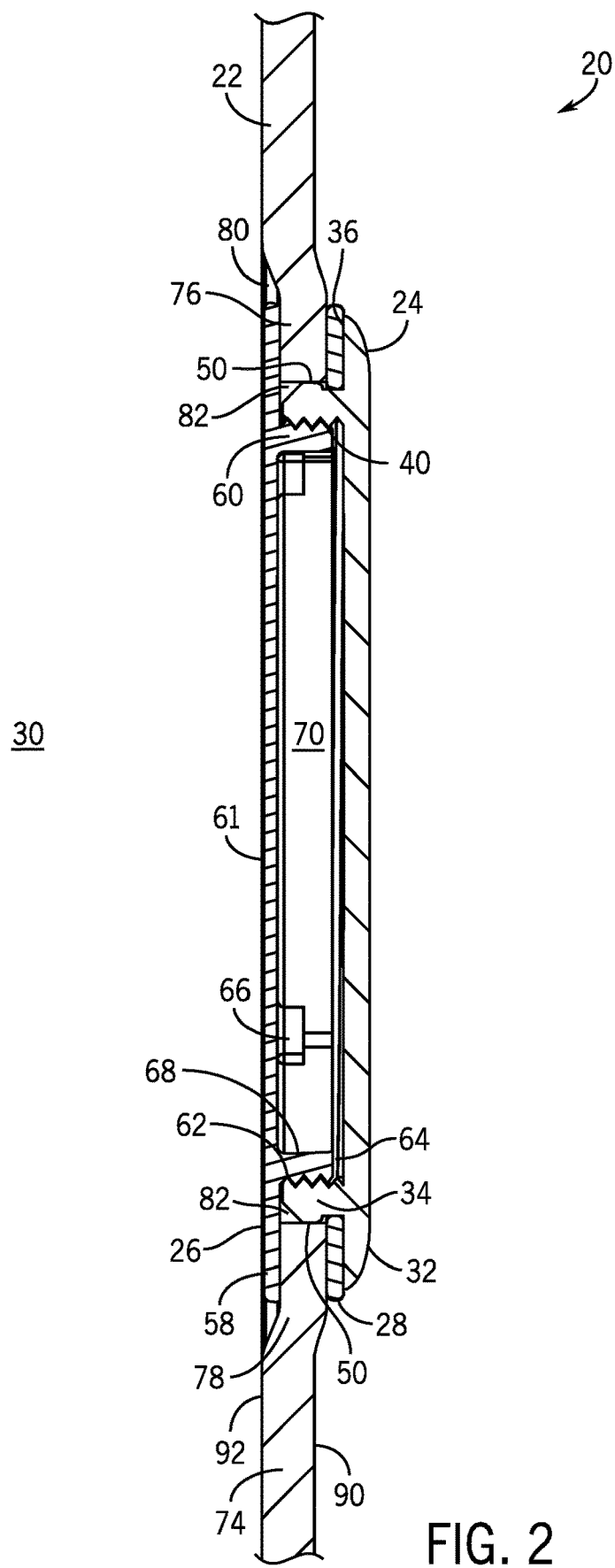
FIG. 2 is a cross-sectional view of the skylight assembly of FIG. 1, taken along the line 2-2 of FIG. 1.
Figure 3:
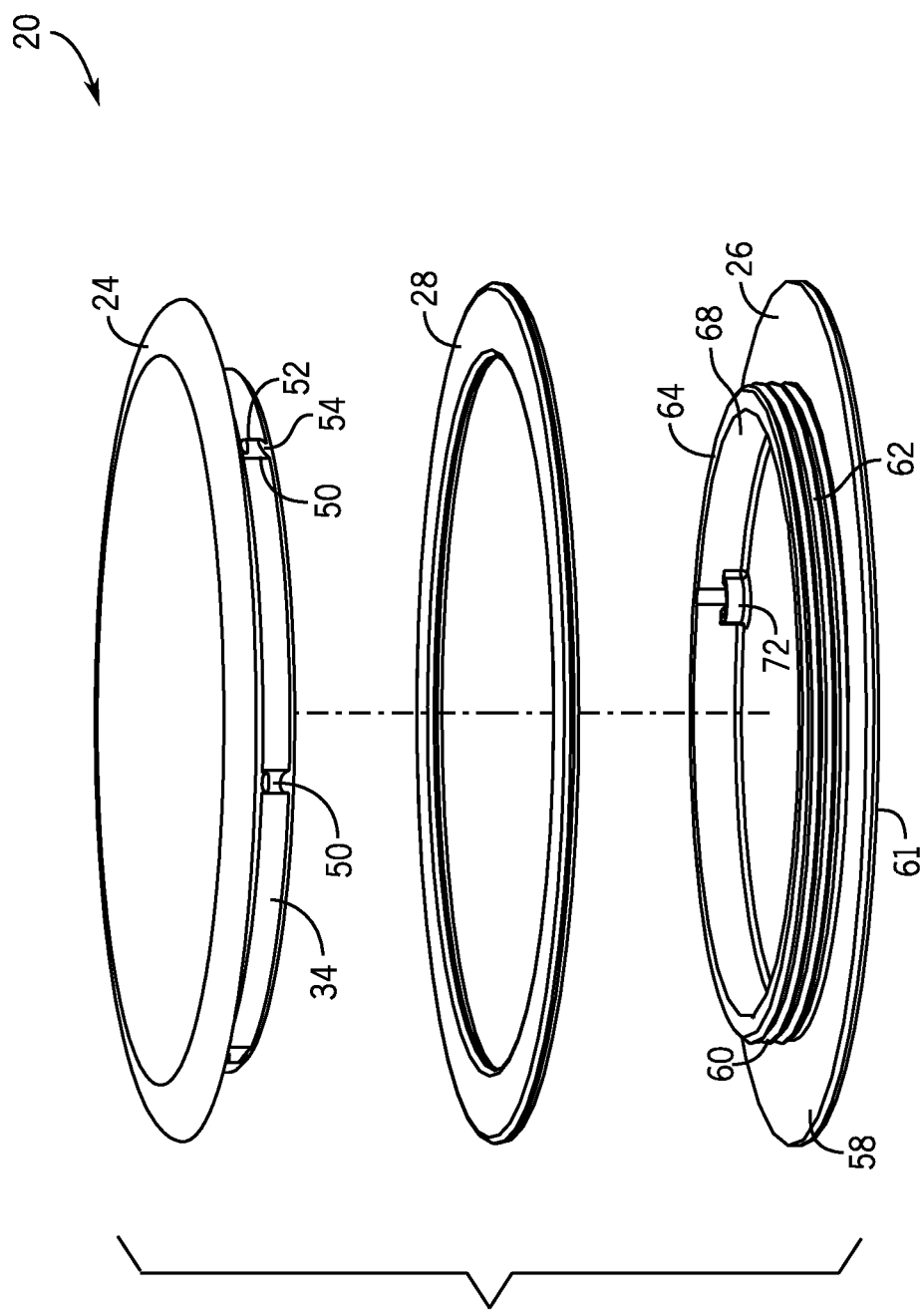
FIG. 3 is an exploded view of the skylight assembly of FIG. 1.
Figure 4:
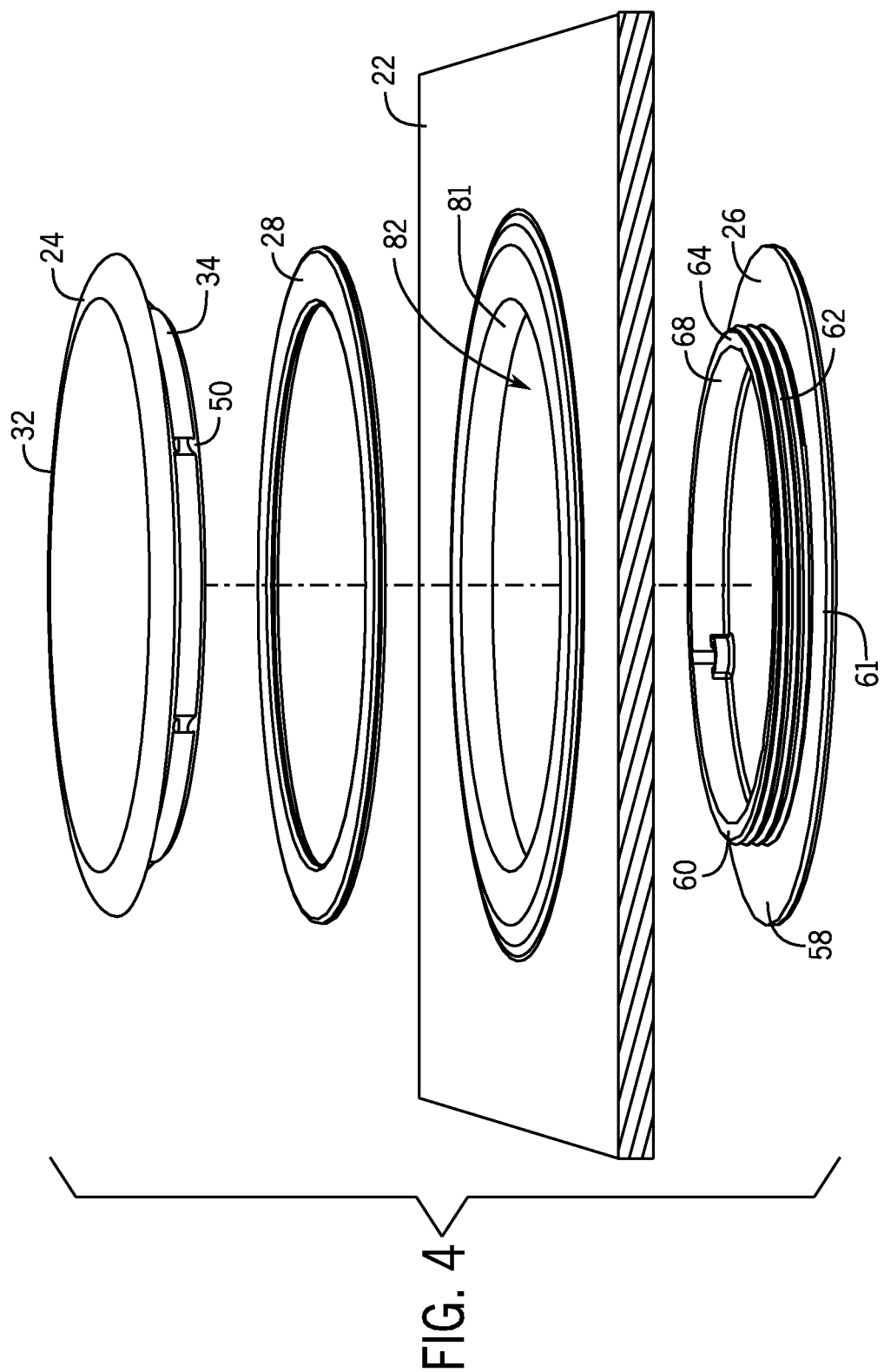
FIG. 4 is an exploded view of the skylight assembly and enclosure panel of FIG. 1.

FIGS. 1-4 illustrate a skylight assembly 20 according to some embodiments of the invention. The skylight assembly 20 is designed to be removably coupled to an enclosure panel 22, for example. The enclosure panel 22 may be provided with a circular hole 82 or opening, as shown in FIG. 4, that is sized and shaped to receive the skylight assembly 20. In some embodiments, the skylight assembly 20 is designed to be coupled to an enclosure panel 22 associated with or provided as part of a enclosure, such as a vehicle (e.g., trailer, truck body, or other vehicle type) or storage container. More specifically, the skylight assembly 20 may be coupled to a surface forming the wall or roof of the enclosure.

As shown in FIGS. 1-4, the skylight assembly 20 can include a lens 24, a nut 26, and a gasket 28. When assembled, the gasket 28 can be positioned between the lens 24 and the panel 22 to seal an interior of the enclosure 30 from the external environment. As explained in more detail below, the lens 24 and the nut 26 can be threadably coupled together to both compress the gasket 28 and engage the panel 22 to retain the skylight assembly 20 thereon.

Figure 5:
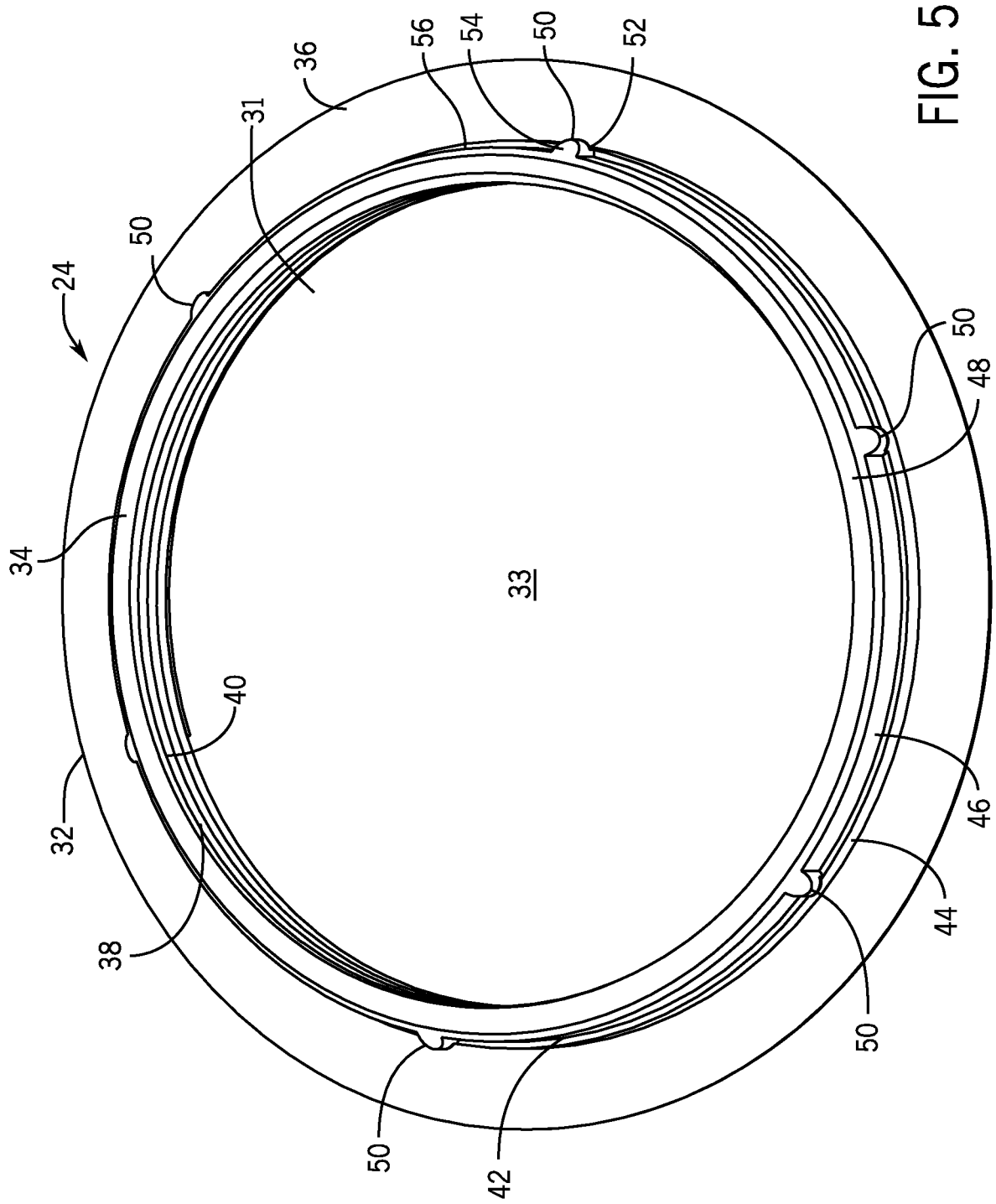
FIG. 5 is a bottom isometric view of a lens of the skylight assembly of FIG. 1.

FIG. 5 illustrates the lens 24 in additional detail. The lens 24 can be formed of a transparent polymeric material, such as polycarbonate or polymethyl methacrylate (acrylic), for example. The lens 24 can be injection molded or otherwise formed to be a generally circular plate 31 including a lens flange 32 and a lens stem 34. The flange 32 includes a generally flat mounting surface 36 that extends radially outward from the stem 34 and can be defined by an annular shape. The stem 34 extends axially away from the flange 32 and the plate 31, perpendicular to a surface 33 of the plate 31, and can also be defined by a generally annular shape. In some embodiments, the stem 34 is centered on and extends from the plate 31. An interior surface 38 of the stem 34 can include female threads 40 that are designed to receive and secure the nut 26, as explained below. An outer surface 42 of the stem 34 can include stacked rings that are provided, for example, in the form of an outer ring 44 and an inner ring 46 extending axially away from the outer ring 44 toward a surface 48 formed at an axial end of the stem 34 (distal from the plate surface 33).

In some embodiments, a series of nubs 50 are provided and protrude radially outward from the stem 34. The nubs 50 can take on a variety of shapes and sizes and can be used to anchor the lens 24 into the hole 82 formed through the enclosure panel 22. As illustrated in FIG. 5, the nubs 50 can be evenly spaced circumferentially about the stem 34, which can help to center the lens 24 within the hole 82. The nubs 50 can extend radially outward from the inner ring 46, beyond the profile of the outer surface of the outer ring 44. In some embodiments, the nubs 50 have a generally curved exterior surface 52 and a tapered upper surface 54. The tapered upper surface 54 can be approximately tangent (and coplanar, in some embodiments) with a beveled surface 56 of the inner ring 46, which extends angularly away from the surface 48.

In the orientation shown, the nubs 50 each extend radially outward beyond any other portion of the stem 34. As explained below, the nubs 50 can form a press fit with a perimeter 81 of the hole 82 formed through the enclosure panel 22, which can keep the entire lens 24 rotationally and axially in place during installation of the skylight assembly 20. Optionally, the perimeter 81 of the hole 82 can include a series of dimples (not shown) which can receive the nubs 50 to prevent rotational or axial movement of the lens 24 relative to the enclosure panel 22. While the nubs 50 have been described as having a generally rounded outer profile, wedge-shaped, saw-tooth, or other protruding shapes can define the nubs 50 in some embodiments.

Figure 6:
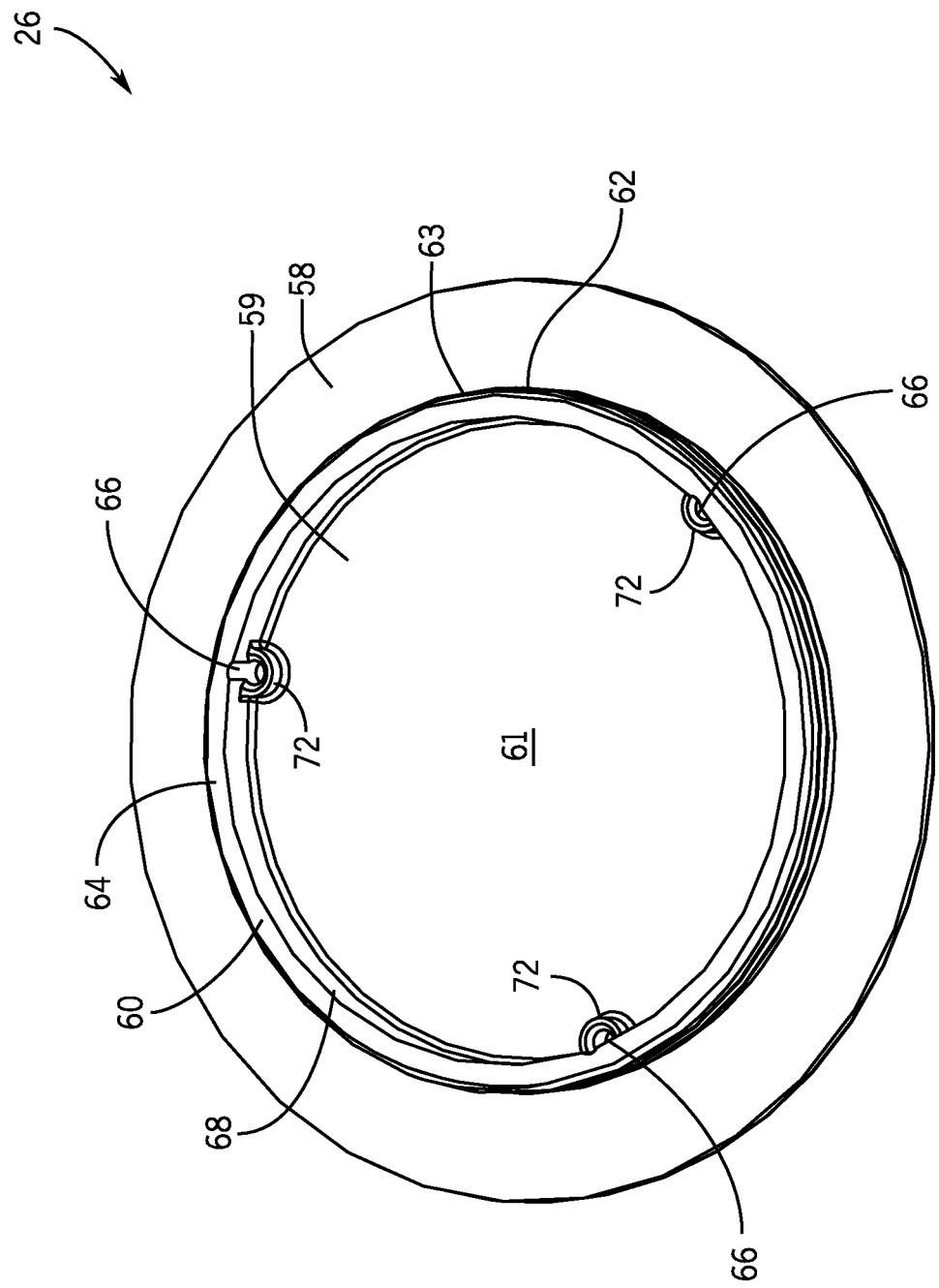
FIG. 6 is a bottom isometric view of a nut of the skylight assembly of FIG. 1.
Figure 7:
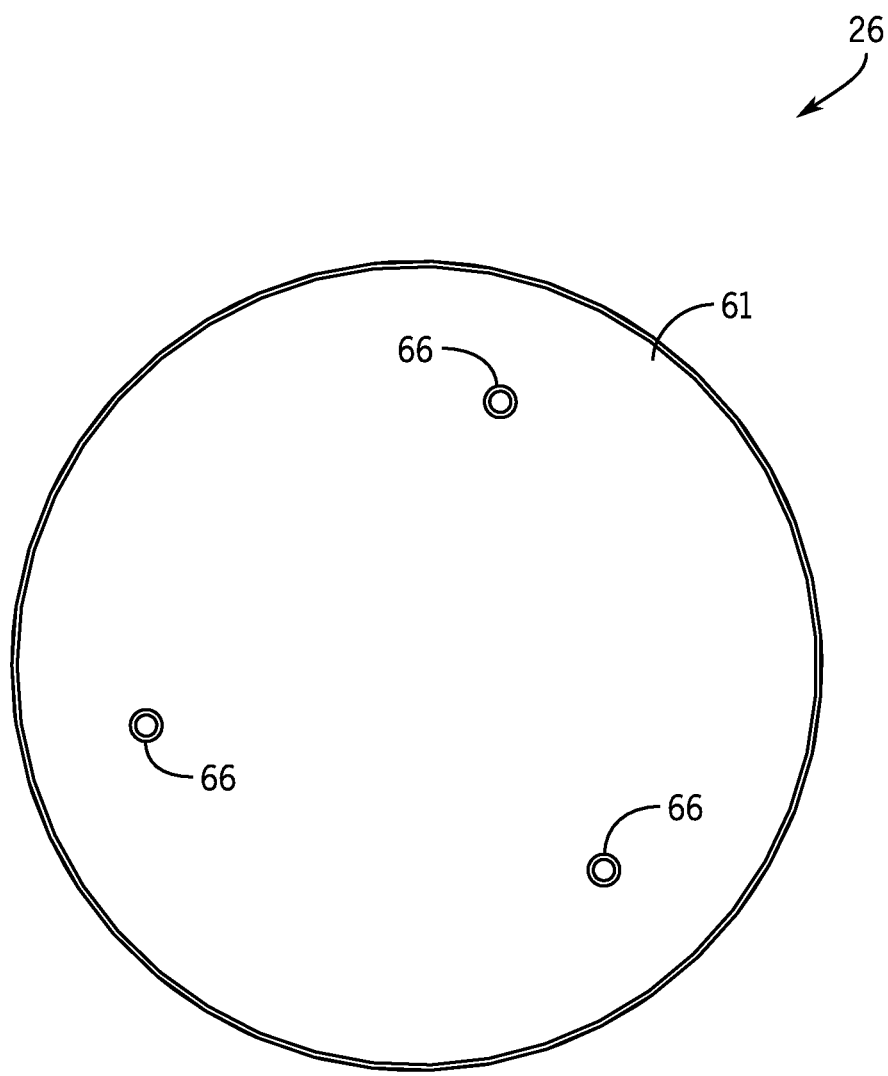
FIG. 7 is a top view of the nut of FIG. 6.

Referring now to FIGS. 6 and 7, the nut 26 is illustrated in isolation. Like the lens 24, the nut 26 can also be formed of a transparent material like polycarbonate or acrylic, for example, to ensure that maximum light transmission occurs through the skylight assembly 20. In some examples, the nut 26 is an injection molded component. The nut 26 can also include a generally circular base 61 with a mounting flange 58 and a stem 60 extending axially away from the mounting flange 58 and the base 61. The mounting flange 58 can be part of the disk-shaped base 61, and can have a generally annular shape that surrounds the stem 60. Male threads 62 are provided circumferentially about an outer surface 63 of the stem 60, and are designed to be received within the female threads 40 of the lens 24 to couple the lens 24 and nut 26 together. In some embodiments, the threads 62 terminate at a flat axial end 64 of the stem 60.

In some embodiments, a series of through holes 66 are formed through the nut 26. The through holes 66 can be formed adjacent to or at least partially extending into an inner surface 68 of the stem 60, and can be used to vent an internal cavity 70 formed between the nut 26 and the lens 24 when the skylight assembly 20 is assembled (as shown in FIG. 2). In some embodiments, the through holes 66 are surrounded by collars 72, which extend away from the inner surface 68 of the stem 60 to circumscribe a portion of each through hole 66. As shown in FIG. 7, the through holes 66 extend entirely through the disk-shaped base 61. As explained below, the through holes 66 and the collars 72 can also be used as a leverage point to help fasten the nut 26 to the lens 24. In some embodiments, the through holes 66 extend perpendicular to the disk-shaped base 61. However, in other embodiments, the through holes 66 can extend through the disk-shaped base 61 at other angles.

As depicted in FIG. 3, the gasket 28 is provided as a circular ring with an opening therethrough. The opening is sized to be larger than the circumference of the stem 34 of the lens 24 so that the gasket 28 may be positioned on the mounting surface 36 of the flange 32 during use. In some embodiments, the mounting surface 36 may be substantially flat, as discussed above and shown in FIGS. 1-4. In other embodiments, however, the mounting surface 36 may include a groove (not shown) sized to receive, seat, position, and retain the gasket 28. Additionally, in some embodiments, the gasket 28 is made of an elastomeric material that can flex to create a water-tight or substantially water-tight seal between the lens 24 and the enclosure panel 22. For example, the gasket 28 may be provided as thin sheet in the form of rubber, metal, paper, silicone, neoprene, polytetrafluoroethylene, polymer, or the like.

Figure 8:
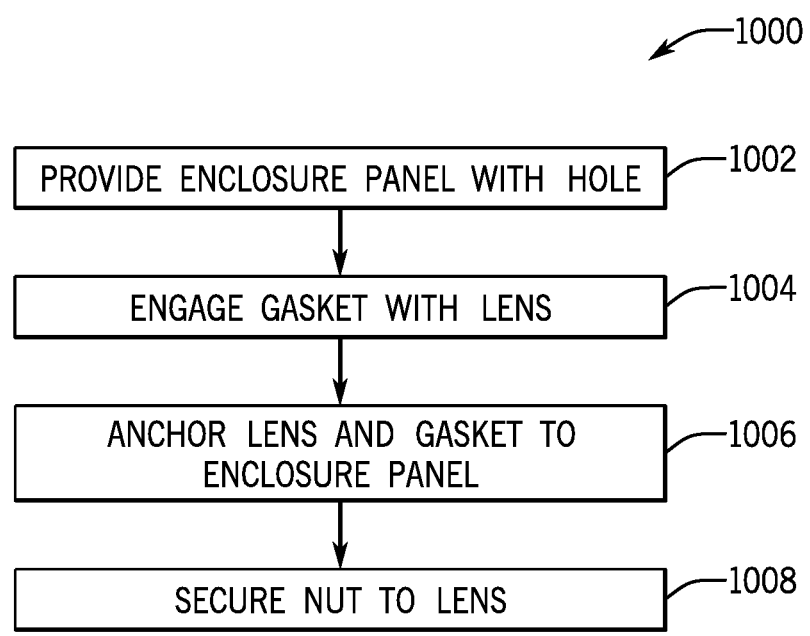
FIG. 8 is a flow chart of a method for installing a skylight assembly into an enclosure panel, according to some embodiments.

Returning now to FIGS. 1-4 and with reference to FIG. 8, the process of installing the skylight assembly 20 into an enclosure panel 22 is described. According to some embodiments, as shown in FIG. 8, a method 1000 for installing the skylight assembly 20 can generally include providing an enclosure panel 22 with hole 82 therethrough at a desired location (step 1002), engaging the gasket 28 with the lens 24 (step 1004), anchoring the lens 24 and the gasket 28 to the enclosure panel 22 (step 1006), and securing the nut 26 to the lens 24 to complete the assembly (step 1008).

More specifically, at step 1002, an enclosure panel 22 is provided with the hole 82 extending entirely through the panel 22. The enclosure panel 22 can be formed from a variety of materials including metals, polymers, or composite materials. In some embodiments, the enclosure panel is formed as a DuraPlate® composite panel (provided by Wabash National Corporation of Lafayette, Ind.) that is provided as a high density polyethylene (HDPE) core that is bonded between two high-strength steel skins.

Additionally, in some embodiments, the enclosure panel 22 is embossed to better accommodate the skylight assembly 20. For example, an inner surface 92 of the enclosure panel 22 is embossed around the hole 82. As shown in FIG. 2, the embossment on the enclosure panel 22 can provide the panel 22 with a flat section 74, a raised section 76 adjacent the hole 82, and a transition section 78 extending between the flat section 74 and the raised section 76. In some embodiments, a punch can be used to form the enclosure panel 22. During formation, the raised section 76 is pushed outward, away from the flat section 74. The enclosure panel 22 elongates in the transition section 78, which can result in the transition section 78 having a slightly thinner cross-section than either of the flat section 74 or the raised section 76. Once fully formed, the raised section 76 and the flat section 74 can extend approximately parallel (e.g., within about 5 degrees) to one another. The difference in depth between the raised section 76 and the flat section 74 creates a pocket 80 behind the raised section 76 and the transition section 78 that circumscribes the hole 82. In some embodiments, a depth of the pocket 80 can be approximately equal to a thickness of the flange 58 of the nut 26.

Once the enclosure panel 22 is formed, both the gasket 28 and lens 24 can be installed to secure the skylight assembly 20 to the enclosure panel 22. More specifically, at step 1004, the gasket 28 can first be received around the stem 34 of the lens 24, and can be seated on the flat mounting surface 36 of the flange 32. At step 1006, the lens 24 is then press-fit into place within the hole 82 in the enclosure panel 22. For example, the lens 24 can be pushed axially through the hole 82 (e.g., from an outside of the enclosure) so that the stem 34 extends into the hole 82 and the gasket 28 is compressed between the flange 32 and an outer surface 90 of the enclosure panel 22. During this process, the nubs 50 can elastically deform from the compressive contact with the perimeter 81 of the hole 82, which creates an interference fit between the lens 24 and the perimeter 81 of the hole 82. The interference between the lens 24 and the perimeter of the hole 82 can restrict rotational and axial movement of the lens 24, which can be useful when coupling the nut 26 to the lens 24 to complete the assembly.

With the lens 24 and gasket 28 secured within the enclosure panel 22, at step 1008, the nut 26 can be secured to the lens 24 to complete the assembly. In embodiments of the skylight assembly 20 having nubs 50 extending outward from a portion of the lens 24, the lens 24 may remain stationary while the nut 26 is threaded onto the stem 34 of the lens 24. Additionally, the gasket 28 can be provided with a coefficient of friction that further restricts rotational movement of the lens 24 relative to the nut 26. This may be particularly useful during installation, as a single operator may be able to install the skylight assembly 20 without additional help.

Figure 9:
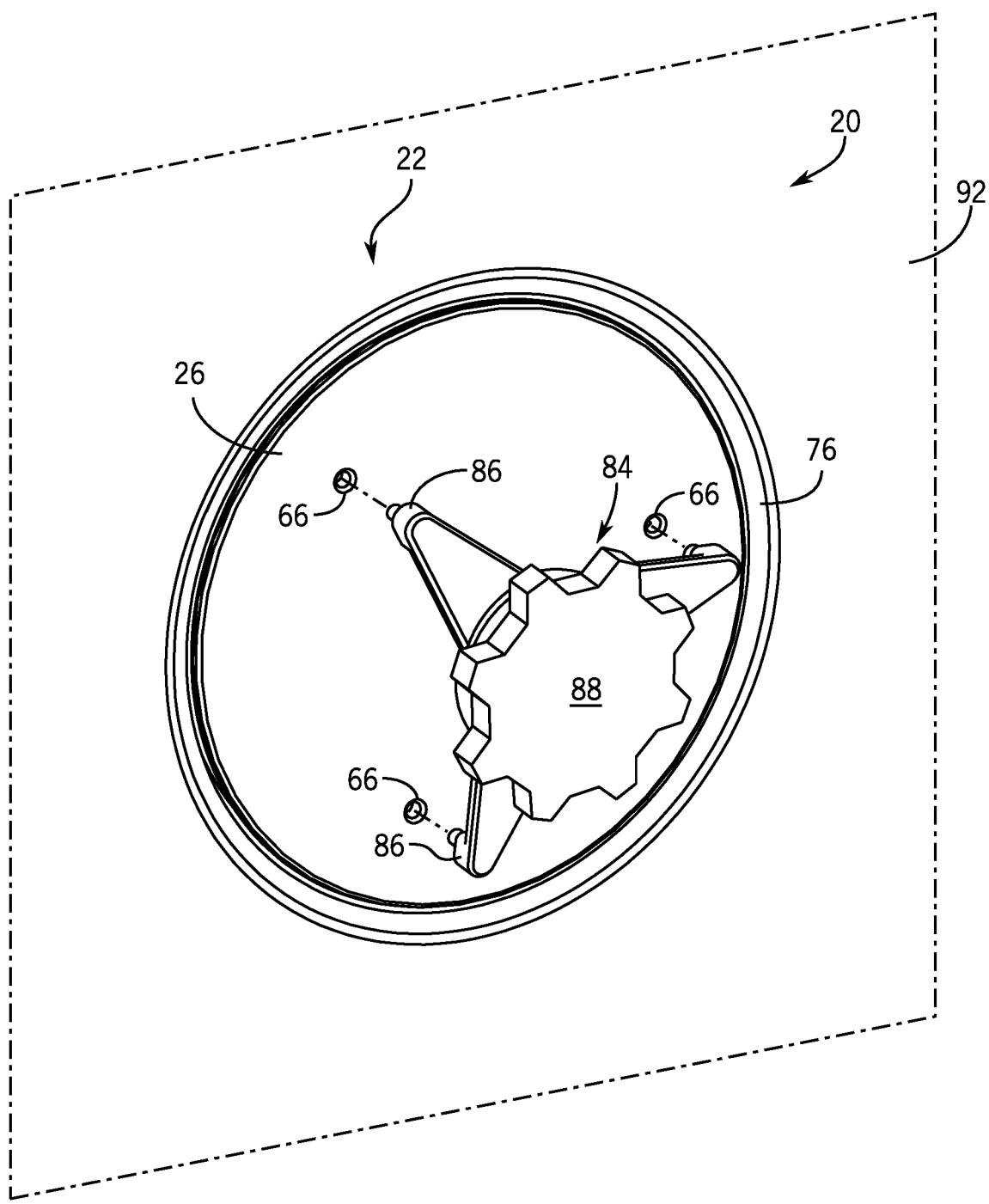
FIG. 9 is a rear isometric view of the skylight assembly of FIG. 1 being assembled with a wrench.

Initially, the nut 26 can be moved toward the lens 24 from an inside 30 of the enclosure so that the nut stem 60 engages the lens stem 34. The nut 26 can be rotated (e.g., from inside the enclosure) into engagement with the lens 24, so that the threads 40, 62 contact each other. In some embodiments, the nut 26 can be hand-tightened into engagement with the lens 24. Additionally, or alternatively, a wrench 84 (shown in FIG. 9) or other tool can be used to fully tighten the nut 26 to the lens 24. As shown in FIG. 9, the wrench 84 can include a plurality of arms 86 that engage the through holes 66 formed in the nut 26. A handle 88 of the wrench 84 can then be rotated (e.g., clockwise) to tighten the nut 26 relative to the lens 24, which is restricted from rotational movement by the interference between the nubs 50 and the perimeter 81 of the hole 82.

Once fully tightened, the lens 24 and the nut 26 can be coupled together with the enclosure panel 22 set between the respective flanges 32, 58, with the nut 26 being flush with the inner surface 92 of the enclosure panel 22. Accordingly, the flange 58 of the nut 26 can contact the inner surface 92 of the panel 22, while the gasket 28 can be compressed against the outer surface 90 of the panel 22 to the point that a waterproof seal can be formed between the enclosure panel 22 and the skylight assembly 20. The waterproof seal can generally prevent water penetration into the interior of the enclosure 30. Furthermore, the compressed contact surfaces against the panel 22 can create friction that helps resist rotation of the skylight assembly 20 within the hole 82 once installed. While the lens 24 and the nut 26 are installed from the outside and the inside of the enclosure, respectively, it is within the scope of the disclosure to provide a skylight assembly having an opposite orientation, so that the lens 24 is adjacent the interior 30 of the enclosure while the nut is adjacent the outside of the enclosure.

The threaded coupling between the lens 24 and the nut 26 can create a continuous and even contact around a circumference of the stems 34, 60, which can provide a strong, solid engagement. In some embodiments, the threaded coupling between the lens 24 and the nut 26 occurs within the thickness of the enclosure panel 22, thus creating a reduced-profile skylight assembly 20. More specifically, as illustrated in FIG. 2, the threaded engagement between the stems 34, 60 can occur entirely between the outer surface 90 and the inner surface 92 of the enclosure panel 22. The embossment on the panel 22 allows the disk-shaped base 61 of the nut 26 to be received within the pocket 80, which then reduces any potential catch point created by the nut 26. For example, when the skylight assembly 20 is installed, an outer surface of the disk-shaped base 61 can be positioned approximately flush with the inner surface 92 of the enclosure panel 22. The inter-panel engagement between the lens 24 and the nut 26 and recessed seating of the nut 24 within the pocket 80 can eliminate (or at least greatly reduce) any inward protrusion of the skylight assembly 20 that could be snagged by objects being moved within the interior of the enclosure 30. Furthermore, the disk-shaped base 61 of the nut 26 can provide a flush, flat interior surface of the skylight assembly 20 to further help to eliminate catch points.

Once assembled and coupled to the enclosure panel 22, the skylight assembly 20 can permit light to pass from an external environment through the enclosure panel 22. More specifically, as noted above, both the nut 26 and the lens 24 may be transparent, or at least partially transparent, for maximum light transmission through the skylight assembly 20 (that is, light transmission even through component engagement areas). As both the lens 24 and the nut 26 have solid base elements (i.e., the plate 31 and base 61), the skylight assembly 20 can form a double-wall barrier covering the hole 82. The double-wall barrier can provide increased impact resistance due to the thicker material in those areas and can permit continued protection from outside elements despite one of the base elements being fractured or damaged. The double-wall barrier can further provide a thermal barrier, that is, the captured dead space within the internal cavity 70 creates a thermal barrier between temperature outside and inside the enclosure, slowing heat transfer. Additionally, the through holes 66 formed in the nut 26 can serve as weep holes, which can help drain moisture (e.g., from condensation) that may build up within the internal cavity 70 between the nut 26 and lens 24. The ventilation provided to the cavity 70 by the through holes 66 can improve the lifetime of the skylight assembly 20 by restricting (and even preventing, in some cases) frost, condensation, or other undesirable contaminant buildup within the cavity 70 of the skylight assembly 20.

Figure 10:
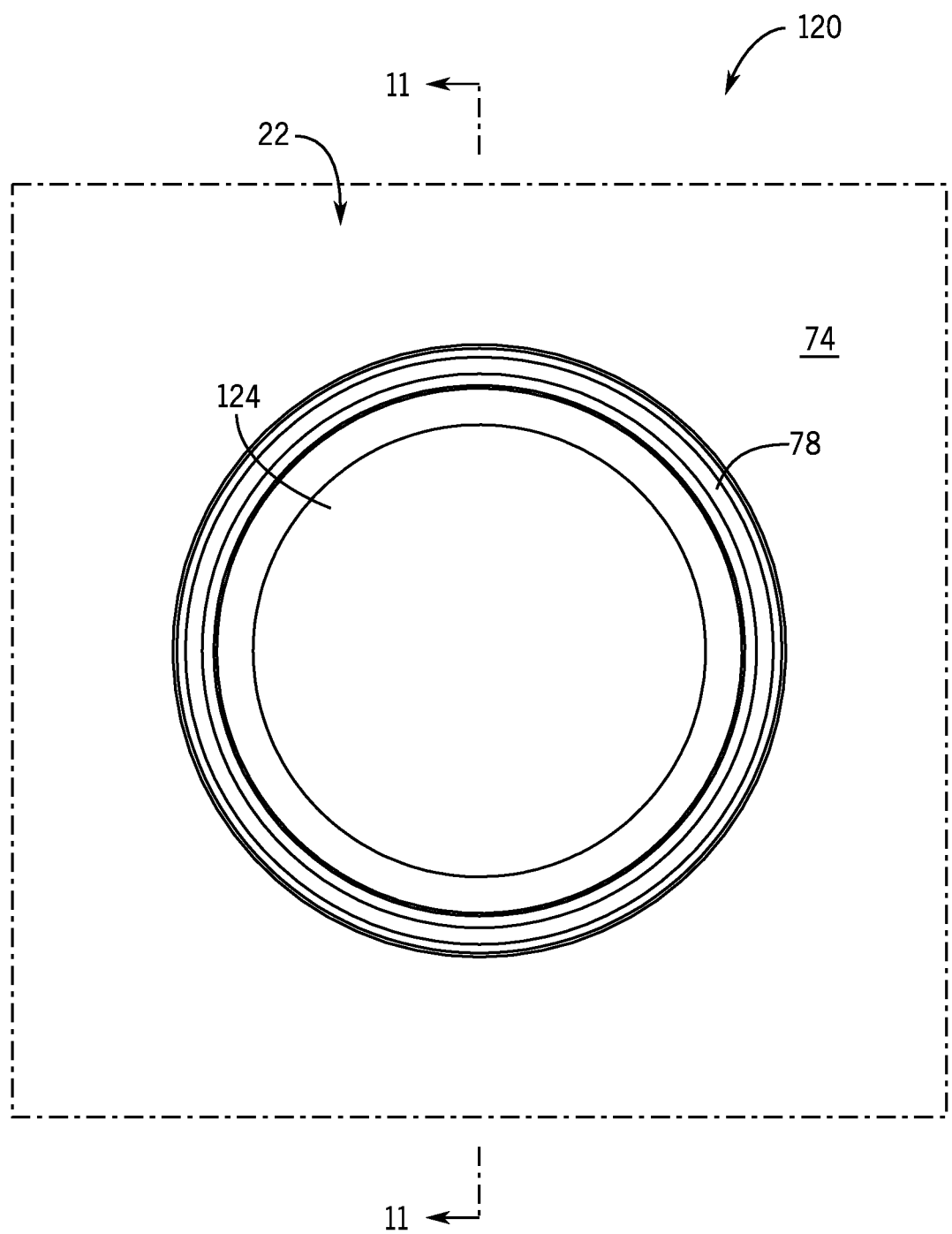
FIG. 10 is a front view of a skylight assembly according to another embodiment of the invention.
Figure 11:
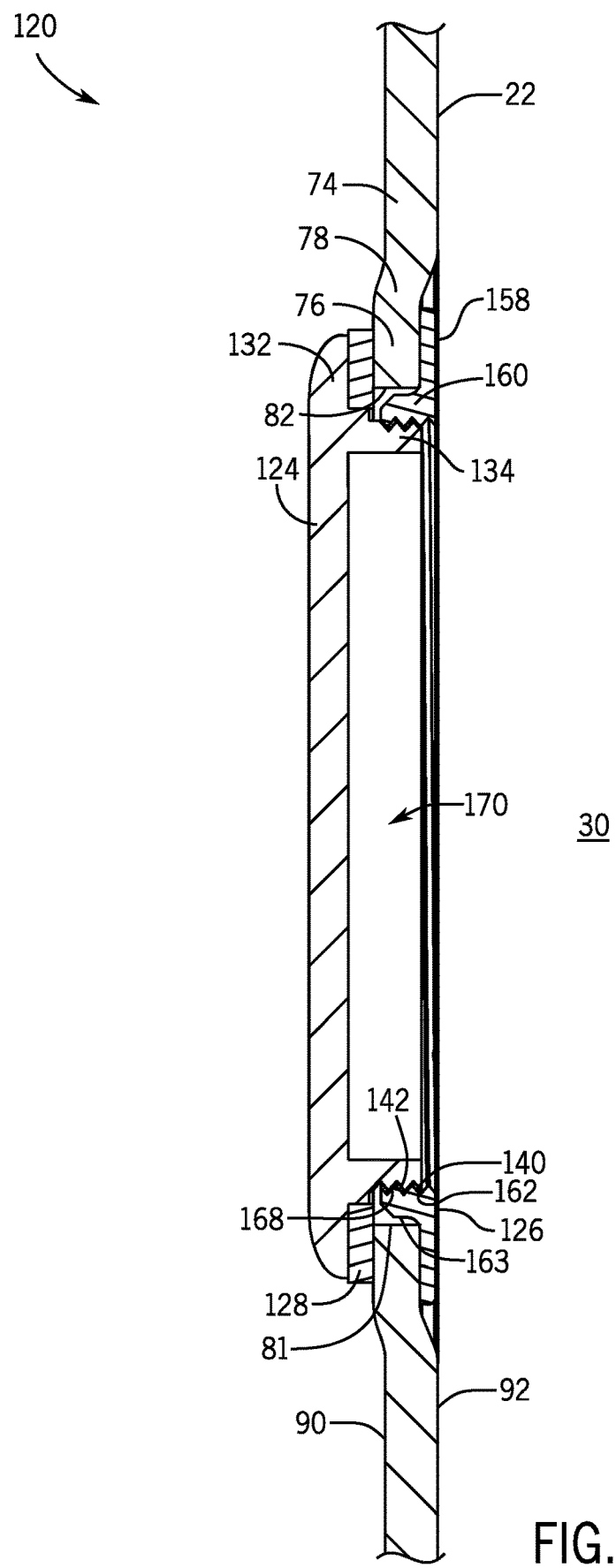
FIG. 11 is a cross-sectional view of the skylight assembly of FIG. 9, taken along the line 11-11 of FIG. 10.
Figure 12:
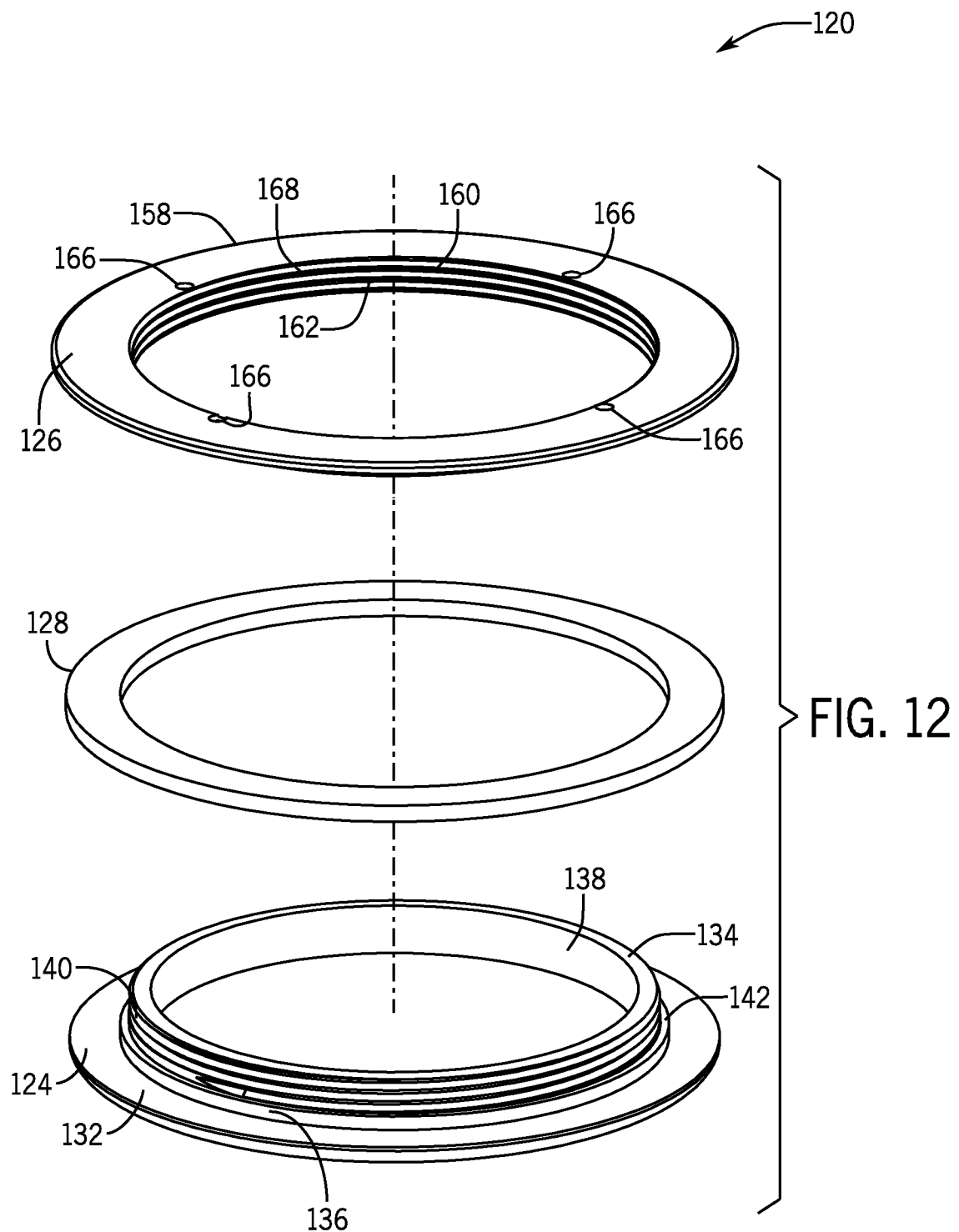
FIG. 12 is an exploded view of the skylight assembly of FIG. 10.

FIGS. 10-12 illustrate another embodiment of a skylight assembly 120. Like the skylight assembly 20, the skylight assembly 120 includes a lens 124 and a nut 126 threadably coupled to engage an enclosure panel 22. A gasket 128 can be placed between the lens 124 and the enclosure panel 22 to prevent precipitation and other contaminants from entering beyond the hole 82 in the enclosure panel 22 and into the interior of the enclosure 30. The lens 124 and nut 126 each share several characteristics with the lens 24 and nut 26, and each include flanges 132, 158 and stems 134, 160, respectively, that together work to couple and compress the skylight assembly 120 to the enclosure panel 22.

Both the lens 124 and nut 126 can once again be formed of transparent polymeric materials, such as polycarbonate or acrylic, for example. The threading is reversed from the skylight assembly 20, however, so that the lens 124 includes male threads 140, while the nut 126 has female threads 162. More specifically, while the skylight assembly 20 of FIGS. 1-7 includes the lens 24 having female threads 40 on an inner surface 38 of the stem 34 and the nut 26 having male threads 62 on an outer surface 63 of the stem 60, the skylight assembly 120 of FIGS. 10-12 includes the lens 124 having male threads 140 on an outer surface 142 of the stem 134 and the nut 126 having female threads 162 on an inner surface 168 of the stem 160. Like the skylight assembly 20, the threaded coupling between the nut 126 and lens 124 occurs within the thickness of the enclosure panel 22, so that a reduced-profile nut 126 can be used. When fully assembled, an outer surface 163 of the nut 126 is adjacent to and/or engages a perimeter 81 of the enclosure hole 82 and the gasket 128 is compressed between the lens 124 and the raised section 76 of the panel 22 to form a leak-free seal between the external environment and the interior of the enclosure 30.

As shown in FIG. 12, to assist tightening the nut 126 onto the male threads 140 of the lens 124, a series of blind holes 166 (e.g., counterbored or countersunk) that extend partially into the nut 126 can be leveraged. That is, the blind holes 166 can partially extend through the stem 160 and/or the flange 158 of the nut 126. Using a tool similar to the wrench 84 shown in FIG. 9, one or more of the blind holes 166 can be engaged and the nut 126 can be rotated relative to the lens 124 to engage the relative threading 140, 162. The rotation causes the skylight assembly 120 to tighten up against the enclosure panel 22 and compresses the gasket 128 to form a seal. Furthermore, as shown in FIGS. 11-12, the nut 126 may be an annular nut in that it does not include a base inside the stem 160. As a result, when assembled, an internal cavity 170 formed between the nut 126 and the lens 124 may be open to the interior 30 of the enclosure.

Figure 13:
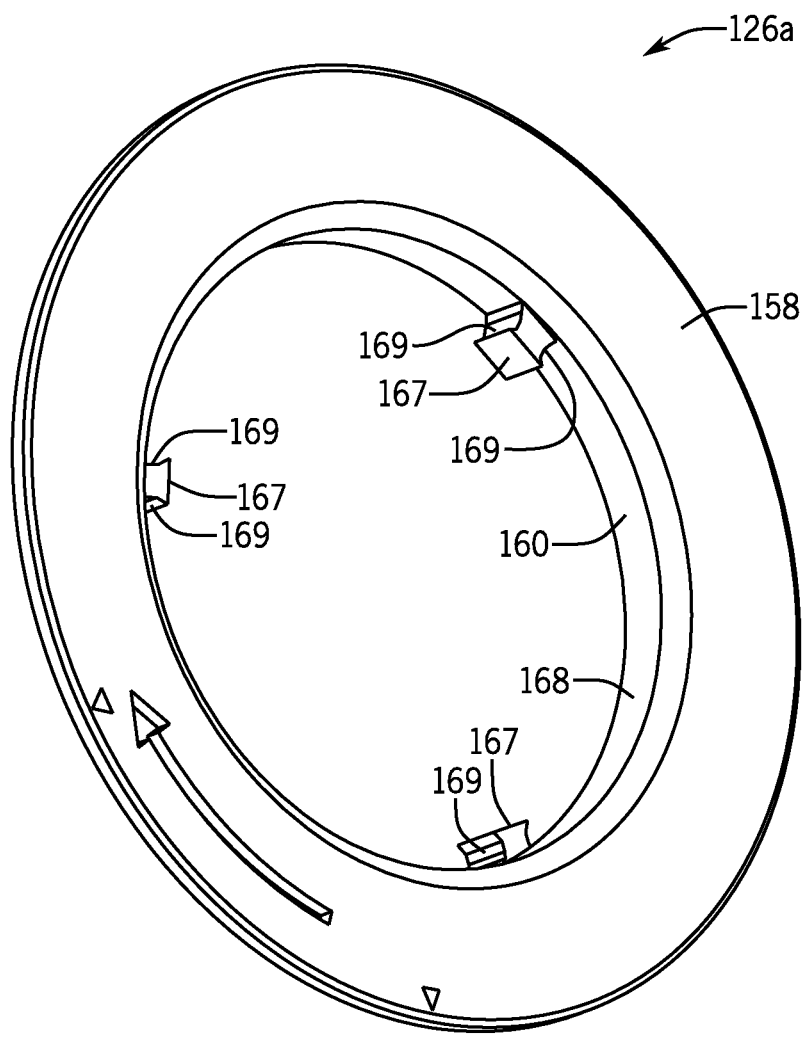
FIG. 13 is a bottom isometric view of an alternative nut for use with the skylight assembly of FIG. 10.
Figure 14:
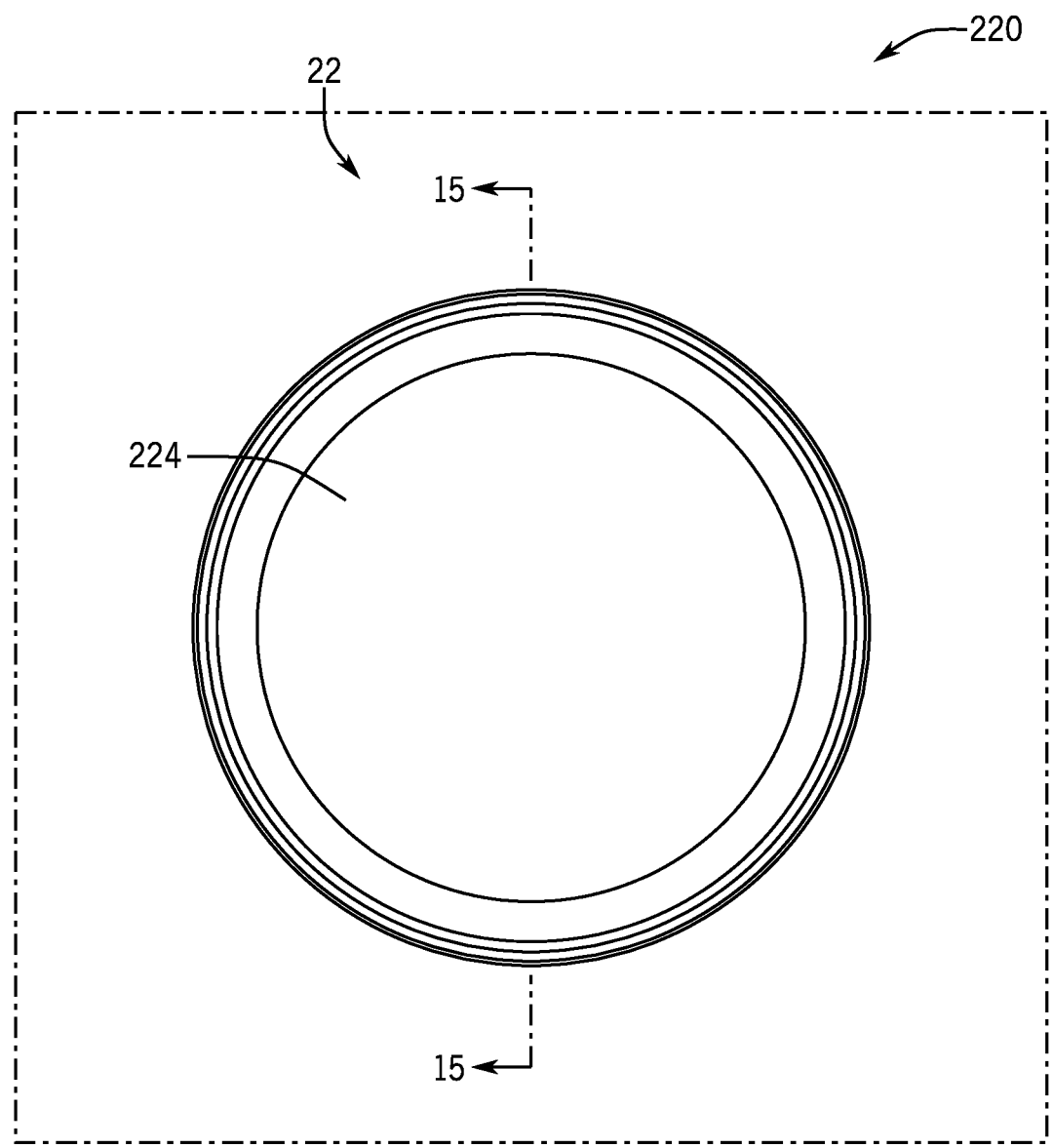
FIG. 14 is a front view of a skylight assembly according to another embodiment of the invention.

FIG. 13 illustrates an alternative nut 126a according to some embodiments, for use with the skylight assembly 120 of FIGS. 10-12. As shown in FIG. 13, the nut 126a can include a stem 160 and a flange 158. Rather than the blind holes 166 provided in the nut 126, the nut 126a can include knobs 167 that extend from an inner surface 168 of the stem 160. The knobs 167 can be evenly spaced apart around the inner surface 168 of the stem 160 and can include engagement features, such as curved edges 169, configured to engage a tool. Accordingly, using a tool similar to the wrench 84 shown in FIG. 9, one or more of the engagement features can be engaged and the nut 126a can be rotated relative to the lens 124 to engage the relative threading 140, 162.

FIGS. 14-17 illustrate yet another embodiment of a skylight assembly 220. Like the skylight assemblies 20 and 120, the skylight assembly 220 is designed to be removably coupled to the enclosure panel 22, for example. Like the skylight assembly 20 and 120, the skylight assembly 220 includes a lens 224, a nut 226, and a gasket 228 positioned between the lens 224 and the panel 22 to seal the interior of the enclosure 30 from the external environment. As explained in more detail below, the lens 224 and the nut 226 are rotatably engageable to compress the gasket 228 and engage the panel 22 to retain the skylight assembly 220 thereon.

Like the lens 24 of FIGS. 1-4, the lens 224 can be formed of a transparent polymeric material, such as a polycarbonate or acrylic, for example. The lens 224 can be injection molded or otherwise formed to include a lens flange 232 and a lens stem 234. In the illustrated embodiment of FIGS. 14-17, the stem 234 includes a plurality of first engagement wedges 280 spaced circumferentially about an axis of the lens 224 and protruding outward from an interior surface 238 of the stem 234. In the illustrated example, the stem 234 includes three first engagement wedges 280 that span an arc of 60 degrees, and are separated about the circumference of the stem 234 by spacing that spans an arc of 60 degrees. In some embodiments, each spacing can be considered an "insertion zone" 283, as further described below. Furthermore, in alternative embodiments, different numbers of first engagement wedges and alternative spacing are possible. For example, the stem 234 may include four engagement wedges that span an arc of 45 degrees, and are separated about the circumference of the stem 234 by spaces having an arc of 45 degrees. In another example, the stem 234 may include two engagement wedges that span an arc of 90 degrees, and are separated about the circumference of the stem 234 by spaces having an arc of 90 degrees, however, other arrangements are also possible.

Figure 15:
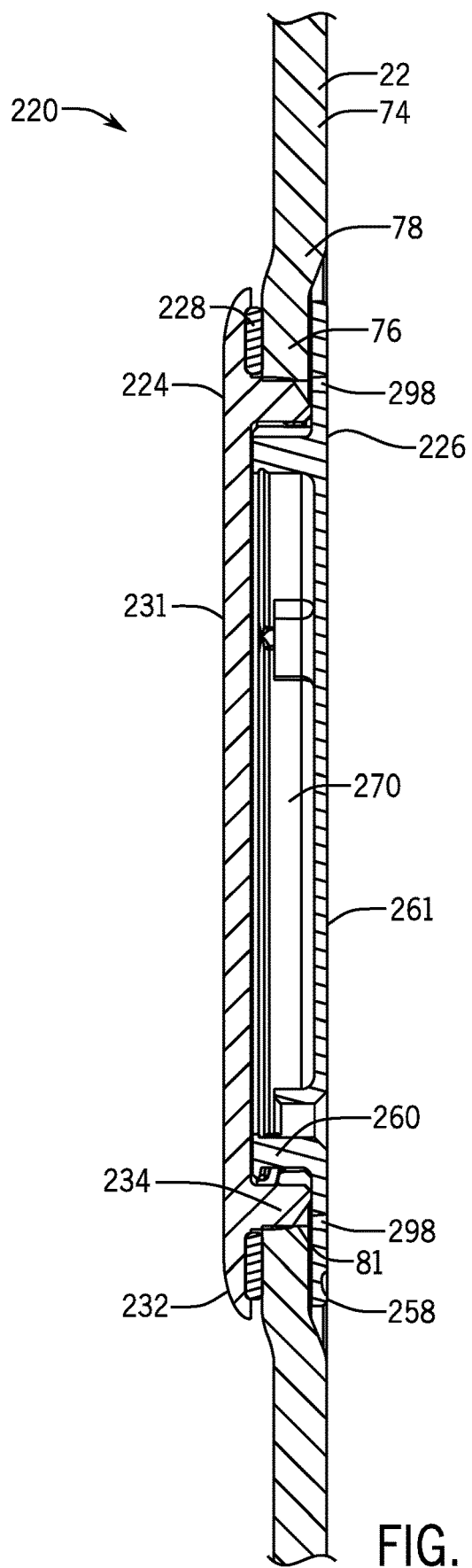
FIG. 15 is a cross-sectional view of the skylight assembly of FIG. 14, taken along the line 15-15 of FIG. 14.
Figure 16:
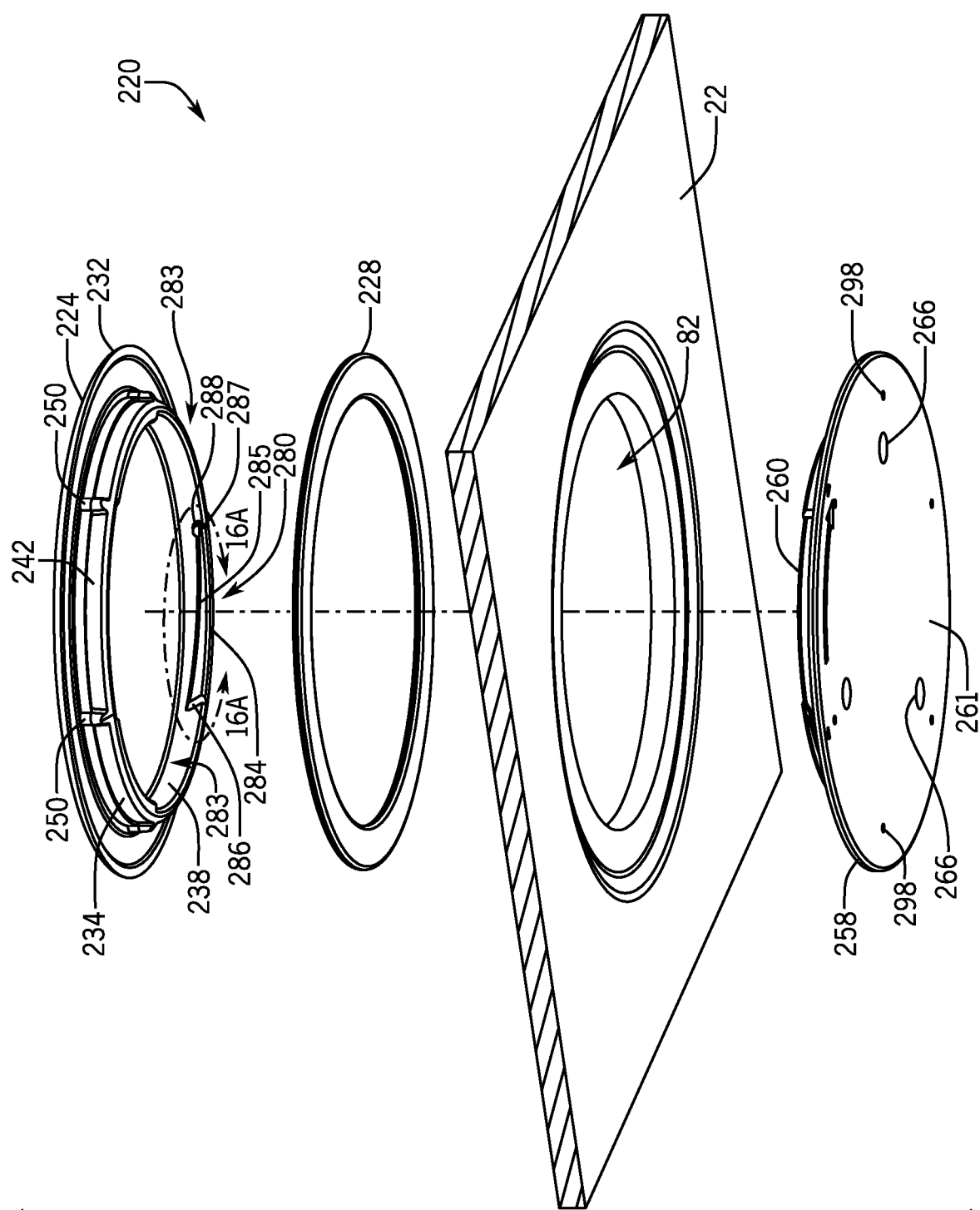
FIG. 16 is an exploded underside view of the skylight assembly of FIG. 14, with FIG. 16A providing a partial isometric view of a lens of the skylight assembly.
Figure 16A:
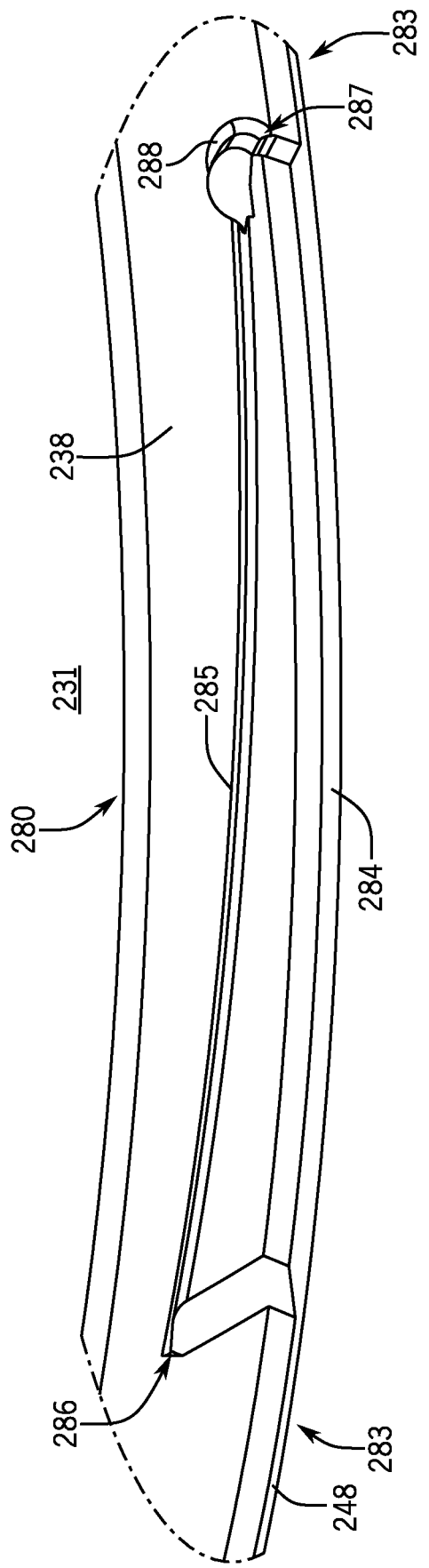

As illustrated in FIGS. 16 and 16A, one side 284 of the each of the first engagement wedges 280 is substantially in the same plane as a flat axial end 248 of the stem 234. An opposite side 285 of each first engagement wedge 280 is angled from a first tip 286 adjacent a circular plate 231 of the lens 224 toward a second, opposite tip 287 adjacent the flat axial end 248 of the stem 234. As such, each second tip 287 of the plurality of engagement wedges 280 is proximal to the flat axial end 248. The tip 287 of the plurality of engagement wedges 280 further includes a first locking feature 288. In the illustrated embodiment, the first locking feature 288 is configured as a protrusion or "button" that extends axially toward the circular base 231. Additionally, in the embodiment illustrated in FIGS. 14-17, the lens 224 also includes nubs 250 along an outer surface 242 of the stem 234 that function similarly to the nubs 50 described above, and thus will not be described here in further detail.

Like the nut 26 of FIGS. 1-4, the nut 226 can be similarly formed of a transparent polymeric material, such as a polycarbonate or acrylic for example. The nut 226 can be injection molded or otherwise formed to include a mounting flange 258, a nut stem 260, and a base 261. In the illustrated embodiments of FIGS. 14-17, the stem 260 includes a plurality of second engagement wedges 289 evenly spaced circumferentially about an axis of the nut 226 and extending from an exterior surface 263 of the stem 260. Generally, the second engagement wedges 289 can mirror the first engagement wedges 280 in terms of amount and relative spacing. More specifically, like the plurality of first engagement wedges 280, the plurality of second engagement wedges 289 include three second engagement wedges 289 that span an arc of 60 degrees, and are separated about the circumference of the stem 260 by spacing having an arc of 60 degrees. Alternative embodiments of the plurality of second engagement wedges 289 are possible, for example, similar to that described above with respect to the first engagement wedges 280.

Figure 17:
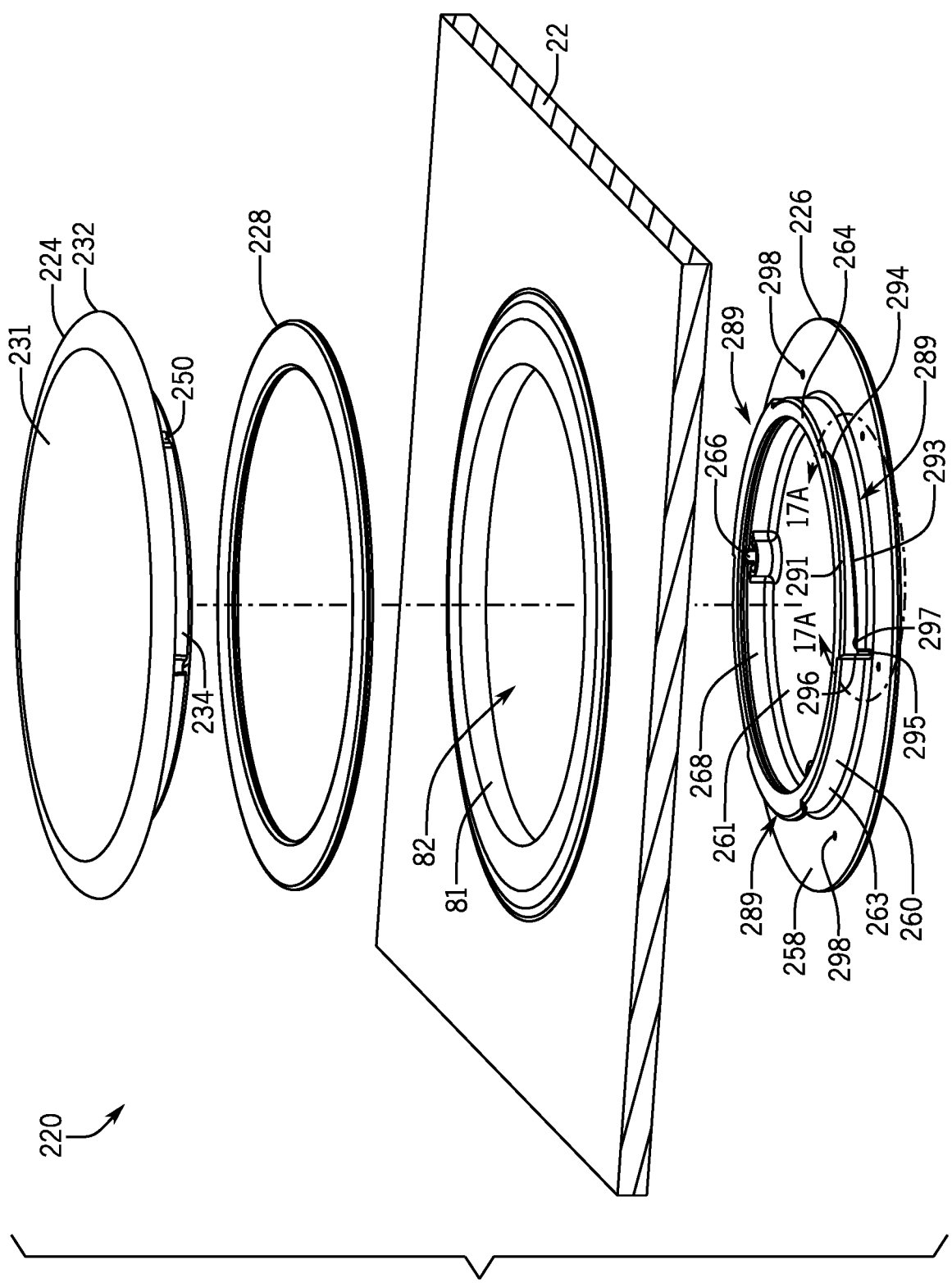
FIG. 17 is an exploded topside view of the skylight assembly of FIG. 14, with FIG. 17A providing a partial isometric view of a nut of the skylight assembly.
Figure 17A:
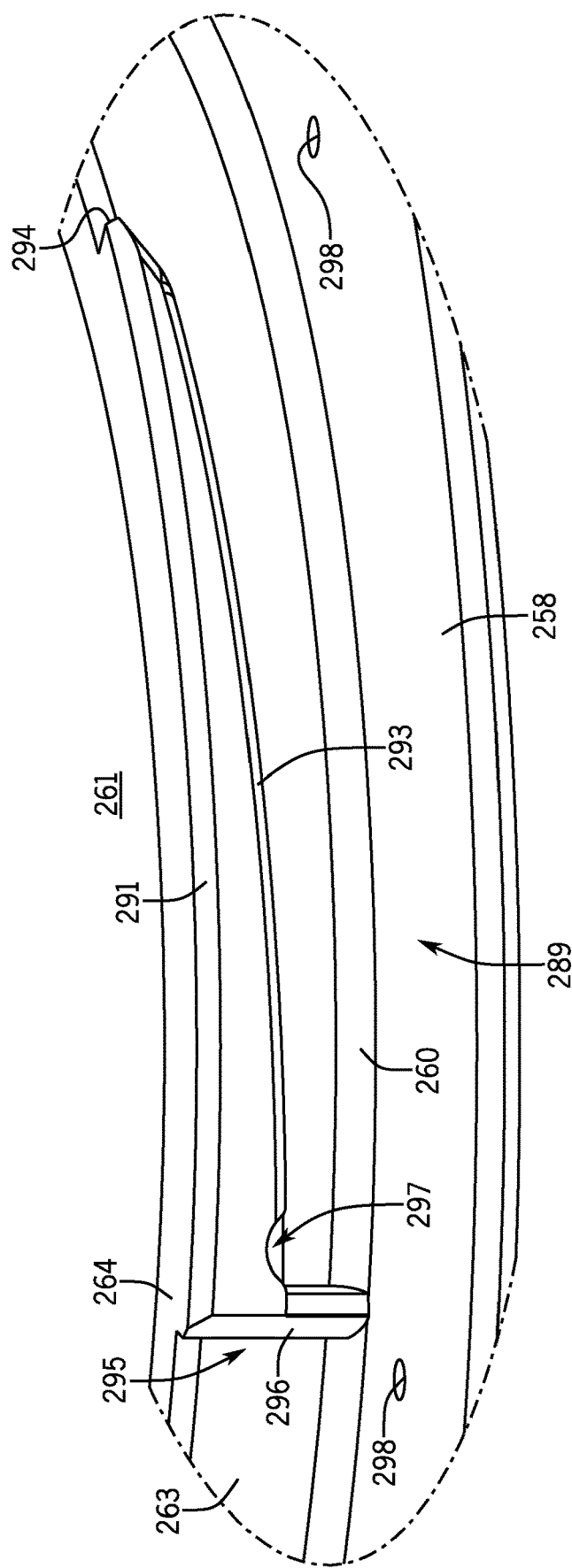

As shown in FIGS. 17 and 17A, similar to the plurality of first engagement wedges 280, the plurality of second engagement wedges 289 have a first side 291 that is substantially in the same plane as a flat axial end 264 of the stem 260. A second, opposite side 293 of each second engagement wedge 289 is angled from a first tip 294 adjacent a circular base 261 of the nut 226 toward a second, opposite tip 295 adjacent the flat axial end 264 of the stem 260. At its widest (e.g., at the first tip 294), the second engagement wedge 289 may span about half of the depth of the stem 260, and may also include a stop feature 296 at the tip 294 that extends an entire depth of the stem 260. In the illustrated embodiment, each of the plurality of second engagement wedges 289 include a second locking feature 297 at the first tip 294 configured as a recess that extends axially inward toward the circular base 261. The second locking features 297 are dimensioned to engage the first locking features 288, thus forming a tension lock when the nut 226 is engaged with the lens 224, as further described below. This tension lock may also be considered a "bayonet" engagement. In alternative embodiments, the plurality of first engagement wedges 280 may include a recess as a first locking feature and the plurality of second engagement wedges 289 may include a protrusion as a second locking feature, however, other configurations are possible that provide a tension lock.

In use, the stem 234 of the lens 224 may be inserted through the opening 82 in the enclosure panel 22 with the gasket 228 seated around the stem 234. The nut 226 may be moved toward the lens 224 so that the plurality of second engagement wedges 289 are generally aligned with and inserted into the insertion zones 283 between the first engagement wedges 280. The nut 226 may then be rotated in a first direction approximately 60 degrees, while the lens 224 remains fixed, so that the second engagement wedges 289 engage, or slide along, the first engagement wedges 280. This rotation and engagement causes the nut 226 to move toward the lens 224 until the first locking feature 288 (the button) is secured with, or locks into, the second locking feature 297 (the recess). As a result, once locked, both the lens 224 and the nut 226 are restricted from rotating in any direction. Furthermore, as the protrusion of the first locking feature 288 engages the recess of the second locking feature 297, causing the lens 224 and the nut 226 to be locked together, the gasket 228 is compressed between the enclosure panel 22 and the lens 224. Additionally, once the first locking feature 288 sits within the second locking feature 297, the lens 224 is forced away from the nut 226 via pressure from the compressed gasket 228, preventing the first locking feature 228 from being unseated from the second locking feature 297. As a result, the gasket 228 can act as a "tension spring" to hold the locking features 288, 297 together. However, in some embodiments, gasket compression tension is not necessary to prevent the locking features 288, 297 from disengaging, for example, as long as some tension exists between the lens 224 and the nut 226.

Additionally, similar to the nut 26 of FIGS. 1-4, the nut 226 may include holes 266 that act as a gripping feature to allow turning of the nut 226 by hand or by a tool (such as the wrench 84 of FIG. 9). The holes 266 may further act as weep holes to allow condensate moisture (e.g., from an internal cavity 270 between the assembled nut 226 and lens 224) to exit the skylight assembly 220. In some embodiments, as shown in FIGS. 15-17, the nut 226 may include additional weep holes 298 located in the spaces in between the plurality of second engagement wedges 289, and, in particular, oriented in a bottom portion of the nut 226 post installation. It should be appreciated that the orientation of the nut 226 after installation can be known since the required angular rotation of the nut to engage the first and second locking features 288, 297 is known. Therefore, the weep holes 298 can always be positioned "downwards" in the nut 226, and adjacent the insertion zones 283 of the lens 224, such that gravity directs moisture out of the weep holes 298. The weep holes 298 can also be positioned adjacent the perimeter 81 of the hole 82 when the skylight assembly 220 is installed. As a result of the weep hole positioning, condensate built up in the internal cavity 270 that cannot escape through the holes 266 can work its way around the spaces between the wedges 280, 289 and through the weep holes 298. Furthermore, any moisture captured between the outer surface 242 of the stem 234 of the lens 224 and the perimeter 81 of the hole 82 can drain out through the weep holes 298.

In the example shown, and as described above, only 60 degrees of rotation is required to secure the skylight assembly 220 (that is, to close a distance between the lens 224 and the nut 226 to a predefined distance that sufficiently compresses the gasket 228 against the panel 22). However, other engagement wedge configurations that require more or less rotation ranging between 0 and 90 degrees is possible. This 60-degree rotation may be a substantially shorter motion for locking together the lens 224 and the nut 226 compared to threaded designs. It should also be appreciated that the wedge configuration of FIGS. 14-16 prevents cross threading as there are no threads to engage. The definitive insertion locations (i.e., the insertion zones 283) and the positive snap of the locking features 288, 297 coming together may make installation easier compared to threaded designs, as there is no guessing where the threads start engagement or guessing the necessary amount of rotation for a sufficient connection between the lens 224 and the nut 226. Further, the wedge configuration provides a locking feature with minimal surface area, which can therefore promote light penetration through the skylight assembly 220. Additionally, in the embodiment of FIGS. 14-17, the wedges 280, 289 provide about 50% contact surface between the circumference of the stems 234 and 260 thereby providing a strong and reliable hold.

While single sets of wedges 280, 289 along the same plane are shown and described herein, in some embodiments, the skylight assembly 220 may include multiple sets of wedges 280, 289 stacked along an axis of each stem 234, 260 (that is, along different planes). Furthermore, while both the lens 224 and the nut 226 are shown and described herein to both include wedges 280, 289, in some embodiments only one of the lens 224 or the nut 226 includes a wedge with a locking feature, while the other component only includes a locking feature along the stem. For example, the locking feature on the non-wedge component can ride along the wedge of the other component during rotation until engaging with the locking feature of the wedge component. Additionally, while the wedges 280, 289 are shown and described herein as each having a single locking feature, in some embodiments, each wedge 280, 289 may include multiple locking features along its length.

Alternative embodiments of the skylight assembly 220 may include an annular nut (not shown) similar in construction to the nut 126a of FIG. 13. More specifically, the annular nut may similarly include a mounting flange and a nut stem that extends axially away from the mounting flange, but may not include an internal base section. The stem may include a plurality of second locking features similar the plurality of second locking features 297 described above with respect to FIGS. 14-17.

As described above, embodiments of the invention provide a skylight assembly with secure mechanical retention to an enclosure panel, with minimal chances of becoming detached and falling into the enclosure. The skylight assembly is secured to the enclosure panel with a profile that is flush with the interior surface of the enclosure panel so as to avoid snag points inside the enclosure. Furthermore, installation of the skylight assembly is simple, requiring minimal skill and time, and without requiring any adhesives, tapes, or chemicals. However, in some embodiments, adhesives may additionally be used.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A skylight assembly for an enclosure having an enclosure panel having an interior side and an exterior side and provided with an opening therethrough, the skylight assembly comprising:
a lens including an annular lens flange and a lens stem extending away from the annular lens flange, the lens stem dimensioned to be received by the opening of the enclosure panel;
a gasket dimensioned to be received around the lens stem and adapted to be seated on a mounting surface of the annular lens flange; and
a nut having a mounting flange and a nut stem extending away from the mounting flange, the nut stem configured to engage the lens stem to secure the skylight assembly to the enclosure panel and compress the gasket against the enclosure panel,
wherein the nut includes a plurality of weep holes configured to allow moisture to escape from the opening.

2. The skylight assembly of claim 1, wherein the mounting flange engages the interior side of the enclosure panel and the gasket engages the exterior side of the enclosure panel so that the gasket is configured to be compressed between the exterior side of the enclosure panel and the mounting surface.

3. The skylight assembly of claim 1, wherein the lens stem includes female threads on an interior surface thereof and the nut stem includes male threads on an exterior surface thereof to engage the female threads.

4. The skylight assembly of claim 1, wherein the nut is configured to engage the lens within a depth of the enclosure panel so that, when secured to the enclosure panel, the nut lies flush against the interior surface of the enclosure panel.

5. The skylight assembly of claim 1, wherein the nut includes a plurality of holes configured as leverage points and dimensioned to be engaged by a tool to facilitate the nut stem engaging the lens stem by rotating the nut via the tool.

6. The skylight assembly of claim 1, wherein a plurality of nubs protrude radially outward from the lens stem and are dimensioned to engage the opening and thereby provide an interference fit between the lens and a perimeter of the opening of the enclosure panel.

7. The skylight assembly of claim 1, wherein the nut is configured as an annular disk wherein the nut stem extends from an inner diameter of the annular disk.

8. A method for installing a skylight assembly through an opening of an enclosure panel having a first side and a second side, the skylight assembly including a lens being at least partially transparent and including an annular lens flange and a lens stem extending axially away from the annular lens flange, a nut being at least partially transparent and including a mounting flange and a nut stem extending axially away from the mounting flange, and a gasket, the method comprising:
engaging the gasket along a mounting surface of the lens;
anchoring the lens and the gasket to the enclosure panel by inserting the lens stem of the lens through the opening from the first side of the enclosure panel so that the annular lens flange is adjacent the first side;
moving the nut toward the opening from the second side of the enclosure panel to engage the nut stem of the nut with the lens stem; and
rotating the nut with less than a 90-degree rotation to force the nut toward the lens until the nut is flush with the second side of the enclosure panel, securing the skylight assembly to the enclosure panel.

9. The method of claim 8, wherein rotating the nut to force the nut toward the lens includes engaging threading of the lens stem with threading of the nut stem.

10. The method of claim 8, wherein rotating the nut to force the nut toward the lens includes engaging a first engagement wedge on the lens stem with a second engagement wedge on the nut stem.

11. A skylight assembly for an enclosure panel with a first side and a second side having an opening therethrough, the assembly comprising:
a lens being at least partially transparent and including an annular lens flange and a lens stem extending axially away from the annular lens flange, the lens stem dimensioned to be received by the opening of the enclosure panel so that the annular lens flange is adjacent the first side of the enclosure panel; and
a nut being at least partially transparent and including a mounting flange and a nut stem extending axially away from the mounting flange, the nut stem configured to rotatably engage the lens stem from the second side of the enclosure panel to secure the skylight assembly to the enclosure panel with less than a 90-degree rotation of one of the lens or the nut.

12. The skylight assembly of claim 11, wherein the lens stem includes an inner diameter having a plurality of first engagement wedges that protrude radially inward and are distributed equally around a lens axis; and
wherein the plurality of first engagement wedges include a first locking feature.

13. The skylight assembly of claim 12, wherein the nut stem includes an outer diameter having a plurality of second engagement wedges that protrude radially outward, and are distributed equally around a nut axis; and
wherein the plurality of second engagement wedges include a second locking feature configured to engage the first locking feature of the plurality of first engagement wedges thereby securing the lens and the nut after the nut is rotated in a first direction.

14. The skylight assembly of claim 13, wherein the plurality of first engagement wedges and the plurality of second engagement wedges are dimensioned so that turning one of the lens or nut between 10 degrees and 90 degrees in the first direction secures the first locking feature with the second locking feature and prevents rotation in a second direction.

15. The skylight assembly of claim 11, further comprising:
a gasket dimensioned to engage a mounting surface of the lens; and
wherein the gasket includes an elastomeric material configured to create a water-tight seal between the first side and the second side when the skylight assembly is secured to the enclosure panel.

16. The skylight assembly of claim 15, wherein the mounting flange engages the first side of the enclosure panel and the gasket engages the second side of the enclosure panel so that the gasket is configured to be compressed between the second side of the enclosure panel and the mounting surface; and
wherein the nut is substantially flush with the first side of the enclosure panel.

17. The skylight assembly of claim 11, wherein the nut includes a plurality of weep holes configured to allow moisture to escape from the opening.

18. The skylight assembly of claim 11, wherein a plurality of nubs protrude radially outward from the lens stem and are dimensioned to engage the opening and thereby provide an interference fit between the lens and the enclosure panel.

19. The skylight assembly of claim 11, wherein the nut is configured as an annular disk wherein the nut stem extends from an inner diameter of the annular disk.

20. A skylight assembly for an enclosure having an enclosure panel having an interior side and an exterior side and provided with an opening therethrough, the skylight assembly comprising:
a lens including an annular lens flange and a lens stem extending away from the annular lens flange, the lens stem dimensioned to be received by the opening of the enclosure panel;
a gasket dimensioned to be received around the lens stem and adapted to be seated on a mounting surface of the annular lens flange; and
a nut having a mounting flange and a nut stem extending away from the mounting flange, the nut stem configured to engage the lens stem to secure the skylight assembly to the enclosure panel and compress the gasket against the enclosure panel,
wherein the nut is configured to engage the lens within a depth of the enclosure panel so that, when secured to the enclosure panel, the nut lies flush against the interior surface of the enclosure panel.

* * * * *